Patented Mar. 26, 1935

1,995,321

UNITED STATES PATENT OFFICE 1,995,321

ABRASIVE ARTICLE AND METHOD OF MANUFACTURING THE SAME

Charles S. Nelson, Niagara Falls, and Donald B. Sharpe, Tonawanda, N. Y., assignors to The Carborundum Company, Niagara Falls, N. Y., a corporation of Pennsylvania No Drawing. Application July 27, 1932, Serial No. 625,203

9 Claims. (Cl. 51—278)

This invention relates to improved abrasive articles and methods of manufacturing the same.

One object of the invention is to make improved abrasive articles bonded with rubber. Another object is to make rubber bonded abrasive articles which will be comparatively free-cutting and yet will be relatively tough, by which is meant that the articles are capable of removing a relatively large amount of stock from the work in a short time and with comparatively little abrasive loss.

Another object is to provide a method for varying the toughness of rubber bonded abrasives. Another object is to provide a new method of making rubber bonded abrasives.

Rubber bonded abrasive articles have been made principally by two processes. The first, or older, of these processes comprises milling abrasive grain into compounded sheet rubber in the usual rubber mills or rolls; the second consists of making a mixture of abrasive grains, an artificial dispersion of rubber in water, and the necessary compounding ingredients such as sulphur, drying the mix and pressing and vulcanizing it. Although a number of processes involving the use of natural latex have been proposed, none of these has been found to be commercially practical in competition with the two processes referred to above.

The first of these processes, the old milling process, was the only method used for a great many years and, although it has two very serious disadvantages, it is still used for some classes of work. In practising this process, it is first necessary to incorporate the abrasive grain with the sheet rubber by means of rolls of the type commonly used for compounding rubber. In order to accomplish this, the rolls must be set comparatively close together so that the grain can be forced into the mass of rubber and the mass of grain and rubber must be passed repeatedly between the closely positioned rolls. Since the rubber is comparatively tough and the rolls are close together, there is considerable crushing of the abrasive grain at this stage. This crushing makes it impossible to control the grit size of the finished article or to reproduce articles which are alike as to grit size. In view of the importance of the grit size, particularly in the coarser grits, this factor has been a serious disadvantage.

The second disadvantage of the milling process, which is perhaps better classified as a limitation than a disadvantage, is the density of the articles. Obviously, an article made by this process is, in effect, a piece of rubber filled with abrasive grain. There is therefore very little pore space in such articles and consequently such abrasives are slow cutting and inclined to heat. Since rubber is tough, rather than brittle like ceramic or even resin bonds, the matrix of rubber can not be broken out, as it is from a ceramic bonded article, but must literally be melted or burned away. Consequently, rubber bonded abrasives made by this milling process have been used for only a limited number of purposes where the characteristics are suitable, as for instance in polishing operations.

The second process noted above as being in extended commercial use has the advantage over the milling process that there is no crushing of the grain and articles are consequently reproducible as to grit size also. Furthermore, articles pressed from mixes bonded with rubber supplied in the form of dispersions are decidedly porous, open, and free cutting and are therefore quite the opposite of milled articles in this respect. They are, however, limited to a considerable extent much as milled articles are, because it has heretofore been impractical to increase the toughness beyond certain limits which are determined by factors which will now be discussed.

There are two methods of increasing the toughness of a bonded abrasive; namely, increasing the bond content and increasing the pressing pressure.

The extent to which the first of these methods can be applied is limited, in rubber bonded abrasives, by the fact noted above that rubber bonds can not be removed by breaking them away as is done with ceramic or resin bonds, but they must be actually melted or burned. Consequently, the fumes resulting from the disintegration of rubber bonds set a very definite and unavoidable limitation to the quantity of rubber bond that can be used. This limit is of the order of 8%. Unless means are supplied for carrying off the fumes, 10% is very nearly the absolute limit, and 8% is practically all that can be used without the workmen becoming prejudiced against the wheel. Furthermore, increasing the rubber content much above 8% tends to make the wheel heat, thereby destroying the bond and hence actually reducing rather than increasing the toughness. Consequently, there is very little chance of increasing the toughness by increasing bond content since 7% is nearly the minimum that can be used without reducing strength below the safe limit.

Toughness can be increased by raising pressing pressure, but here again a limit is set by economic factors. Both ceramic and resin bonded abrasives are usually pressed at from 1000 to 2000 pounds per square inch. Molds and presses are available which permit and supply such pressures. In order to increase the toughness of rubber bonded abrasives made from dispersed rubber so they will approach the toughness of milled rubber, it is necessary to use pressures of 5000 to 8000 pounds per square inch, which are from five to eight times those used in ceramic or resin bonds. Such pressures are economically impractical.

The use of rubber bonded abrasives has accordingly been restricted to some extent because of the limitations set forth in the previous discussion. Attempts to compete with resin and ceramic bonds in the snagging of castings, for example, have been more or less unsuccessful, in spite of the obvious advantages of rubber bonds such as increased strength in comparison with ceramic bonds and lesser cost in comparison with resins because rubber bonded wheels have either been so slow cutting as to be expensive in labor cost for operation or, on the other hand, so short lived as to be prohibitively expensive in wheel cost.

We have discovered a method by which it is possible to make rubber bonded abrasives which have properties which might be said to be intermediate between those of milled articles and articles made by pressing mixes bonded with dispersed rubber. Our process is relatively inexpensive, does not require a large outlay for special molds and presses, and at the same time, makes articles which have properties which have been needed to fill in the gap between the dense, tough, slow-cutting milled articles and the open, fast-cutting but short-lived dispersed rubber articles. Our process also provides a method of making relatively dense rubber bonded abrasives with a predetermined and controlled grit size, articles which so far as we are aware have not been known heretofore.

In practising our invention, we prefer to use a material which is made by a process which is fully disclosed and claimed in a copending application by Charles E. Nelson and Garnett H. Porter, Serial No. 384,520, filed August 8, 1929.

According to one process of that application, abrasive grain is first wet with an aqueous solution of a coagulant such as lead acetate, and is then mixed wtih an artificial dispersion of rubber and the usual compounding ingredients, dried to a critical moisture content which has been found to be between 5% and 10%, depending upon the composition of the mix, and then disintegrated by subjecting it to a sort of mechanical flail whereupon the mix is broken down to individual grains coated with rubber compound or small clusters of such grains. The disintegrated mix can then be further dried until it is dry to the touch, giving a product which has been found to be suitable for use in pressing rubber bonded abrasives. This product can also be stored indefinitely without substantial deterioration. This is the product we prefer to use in our process, although we may use other materials as will be set forth later.

Although there is practically no adhesion between abrasive grain and vulcanized rubber, the rubber from latex or milled rubber (unvulcanized), it has been found that there is appreciable adhesion between the grain and the unvulcanized rubber from an artificial dispersion of rubber in the product made by the Nelson-Porter process just summarized. This adhesion is highly desirable in our process although as previously stated, our process is not limited to the use of material made by the Nelson-Porter method.

In carrying out one form of our invention, when it is desired to make an article somewhat more dense than is feasible by pressing alone, we take a mixture of rubber and abrasive grain such as is made by the Nelson-Porter process for example, and instead of putting this mix into a mold, we pass it through a pair of rolls, as for example calendering rolls such as are ordinarily used for calendering sheet rubber or abrasive mixes made by milling grain into sheet rubber on compounding rolls. We space the rolls such a distance apart that the mix is rolled into a sheet about one-half to three-quarters of an inch thick and then, in order to increase the thickness of the sheet if a thicker article is desired, we open the rolls and repass a number of layers of the thin sheet to compact them into a sheet of the desired thickness, or we may stack several layers, the layers being caused to adhere to each other by the subsequent pressing under heat. From this sheet we then cut the article in any desired shape, curing being effected either by a continuous treatment under pressure or, alternatively, by a preliminary or set cure in a heated press for a relatively short time followed by an oven cure without the application of pressure as described and claimed in copending application, Serial No. 408,312, filed November 19, 1929.

In passing the prepared mix through calendering rolls to compact it into sheets, there is practically no crushing of the abrasive grain because the grain and rubber are already mixed and it is unnecessary to apply sufficient pressure to force the grains into the rubber as is required in the milling process. Furthermore, the coating of rubber on the grains cushions the pressure and, in effect, protects the grains against the application of sufficient pressure to crush them. This method makes an article having a toughness somewhat greater than that of articles pressed from the same mix and yet having sufficient porosity to be free-cutting much like a pressed article. We have designated this process as "compacting".

Where a denser and tougher article is required, we modify our process somewhat along the following lines. The amount of rubber, as a dispersion, added to the grain is reduced and additional rubber is incorporated in the form of sheet rubber. For example, we prepare a mix containing 5% rubber in the form of dispersion and, after drying in accordance with the Nelson-Porter process described above, we mill this mixture into sufficient broken-down sheet rubber to bring the total rubber content of the mix to 7%. Here again there is found to be practically no crushing of the abrasive grain and we have been able to make abrasive articles by this modification of our process in which the grit size was not materially altered. This process is referred to as "sheeting".

We have found that this addition of a small proportion (for example 2% of the mix) of sheet rubber increases the toughness of the abrasive article remarkably. For example, such articles have been found to be nearly as tough as those made by the old milling process and containing the same proportion of bond, and yet they are more free cutting and cooler cutting than milled articles. The addition of a little sheet rubber seems, in other words, to toughen the article markedly without a corresponding reduction in the free-cutting properties of articles pressed from dispersed rubber mixes.

The following specific examples of two modifications of our invention are given for illustrative purposes and are not intended to be limitative.

Example I—Compacting process 888 parts by weight of #14 grit fused alumina are wet with 70 parts of a 10% solution of lead acetate in water. In a separate container 35 parts of sulphur are mixed with 175 parts of a 40% dispersion of previously coagulated rubber in water and this mixture is then stirred into the moistened grain. After a few minutes mixing, a paste of 7 parts calcined magnesia in an equal quantity of water is added and the mixing is continued until the mix is uniform. This mixture is then spread out in metal trays in a layer about an inch thick and dried to a moisture content of 7% whereupon it is removed from the trays, disintegrated, and passed through a 4 mesh screen. The mix is then returned to the drier and the drying continued until the moisture in the mix is reduced to equilibrium with the surrounding atmosphere. It is then passed between calender rolls to compact it into a sheet from which is cut a disk approximately the shape of the desired article. This shape is then placed in a mold and cured between the platens of a press under 5000 pounds per square inch pressure for one hour at a temperature of 300° Fahr. The article is then removed from the mold and cured in an oven for sixteen hours at 320° Fahr.

Example II—Sheeting process 150 parts of a 40% dispersion of previously coagulated rubber in water are mixed with 40 parts of sulphur and 8 parts of magnesium oxide made into a paste with 10 parts of water. This mixture is added to 870 parts of #16 grit silicon carbide and after thorough mixing, 80 parts of a 10% solution of lead acetate in water are added to coagulate the rubber. The mix is then dried to equilibrium with the air and added to 20 parts of smoked sheet rubber which have been rendered plastic by working between the warm rolls of a compounding mill. The combined mass is then made homogeneous by passing it between the rolls and is rolled into a sheet from which is cut an article of approximately the shape and size desired in the finished article. This shape is then put into a mold and cured under a pressure of 1000 pounds per square inch and at a temperature of 300° Fahr. for sixteen hours. It is then ready to be bushed and dressed to its final size.

It has been found possible to produce articles through a considerable range of density and toughness by combining the practice of our invention with the known methods of varying the proportion of bond to grain and the pressure applied during the cure. Furthermore, we have been able to make articles which have substantially the toughness of milled abrasives without causing an appreciable change in the size of the abrasive grain.

The following table illustrates the relative reduction in grit size of articles made by the two processes of our invention in comparison with the milling process and the pressing process. The data was secured by making articles of the same grit size and total rubber content from grain which has been carefully screened, burning off the bond, and again screening the grain. Results are expressed as per cent fineness which is obtained by multiplying the respective percentages retained on a screen by the size of the opening in the screen expressed in millimeters, and adding these factors. The magnitude of the per cent fineness increases with an increase in particle size. The last column shows the percentage of the grain added which was lost in process.

| | Percent fineness | | | | Percent grain lost in process |
|---|---|---|---|---|---|
| | Before | After | Change | Percent change | |
| Pressing process | 129.7 | 121.5 | 8.2 | 6.3 | 0 |
| Compacting process | 129.7 | 118.8 | 10.9 | 8.4 | 0 |
| Sheeting process | 129.7 | 118.0 | 11.7 | 9.0 | 2 |
| Milling process | 129.7 | 84.2 | 45.5 | 35.1 | 27 |

It will be seen that either our compacting or our sheeting process compares favorably with the pressing process and is much superior to the old milling process in respect to grain breakage. An additional consideration is the fact that all the grain is incorporated in the finished article when made by our compacting process and the loss is only 2% with our sheeting process in contrast to a loss of 27% in the article made by the milling process.

From a consideration of these figures, it is apparent that we have been able to compact articles by milling them without materially changing the size of the abrasive grains. We have therefore overcome one of the serious objections to the old milling process. Furthermore, we have been able to make articles having combinations of properties and grinding characteristics never heretofore known so far as we are aware.

The term "dispersion of previously coagulated rubber" as used in this specification and the appended claims is interpreted to mean the manufactured product made from coagulated rubber as distinguished from latex which is a product of nature and in which the rubber has not been coagulated.

Having fully described our invention, what we claim is:—

1. The method of making a rubber bonded abrasive article which comprises preparing a mixture of abrasive grains, a vulcanizing agent and a dispersion of previously coagulated rubber, rendering the mixture disintegrable without substantial separation of the grains from the bond by reducing the moisture content of the mix to a value between 5% and 10% of the weight of the mix, disintegrating the mix, removing substantially all the moisture, and compacting the mix by passing it between revolving rolls spaced apart sufficiently to prevent substantial breakdown in grain size.

2. The method of making rubber bonded abrasive articles which comprises mixing abrasive grains with a dispersion of previously coagulated rubber and a vulcanizing agent, drying said mixture to such a degree that it becomes disintegrable without substantial separation of the grains from the bond, disintegrating the dried mixture and compacting the disintegrated mixture by passing it between rolls spaced apart sufficiently to prevent crushing the abrasive grains.

3. The method of making rubber bonded abrasive articles which comprises mixing abrasive grains with a dispersion of previously coagulated rubber and a vulcanizing agent, drying said mixture to such a degree that it becomes disintegrable without substantial separation of the grains from the bond, disintegrating the dried mixture, and further drying the mixture until substantially all of the water is removed, and compacting the thus dried mixture by passing it between rolls spaced apart sufficiently to prevent crushing the abrasive grains.

4. The method of making a rubber bonded abrasive article which comprises preparing a mixture of abrasive grains and a dispersion of previously coagulated rubber, reducing the moisture content of the mix to approximately 7% of the weight of the mix, disintegrating the mix, removing substantially all the moisture, and compacting the mix by passing it between revolving rolls spaced apart sufficiently to prevent substantial breakdown in grain size, but sufficiently close to produce a compacting effect on the mix.

5. The method of making rubber bonded abrasive articles which comprises mixing abrasive grains with a dispersion of previously coagulated rubber and a vulcanizing agent, drying said mixture to such a degree that it becomes disintegrable without substantial separation of the grains from the bond, disintegrating the dried mixture, mixing therewith a vulcanizable compound of coagulated rubber and compacting the thus formed mixture by passing it between rolls spaced apart sufficiently to prevent crushing of the abrasive grains.

6. The method of making a rubber bonded abrasive article which comprises preparing a mixture comprising abrasive grains and a dispersion of previously coagulated rubber, drying said mixture to such a degree that it becomes disintegratable without substantial separation of the grains from the bond, disintegrating the dried mixture, separately working sheet rubber into a plastic mass, and combining the disintegrated mixture and the mass of plastic sheet rubber into a homogeneous mixture by passing the two materials simultaneously between rolls spaced apart sufficiently to prevent substantial breakdown in grain size.

7. The method of making a rubber bonded abrasive article which comprises preparing a mixture comprising abrasive grains and a dispersion of previously coagulated rubber, drying said mixture to such a degree that it becomes disintegratable without substantial separation of the grains from the bond, disintegrating the dried mixture, separately working sheet rubber into a plastic mass, combining the disintegrated mixture and the mass of plastic sheet rubber into a homogeneous mixture by passing the two materials simultaneously between rolls spaced apart sufficiently to prevent substantial breakdown in grain size, rolling the mixture into a sheet of suitable thickness, and cutting an article from the sheet.

8. The method of making a rubber bonded abrasive article which comprises preparing a mixture comprising abrasive grains, a vulcanizing agent and a dispersion of previously coagulated rubber, disintegrating the mixture into a mass of individual granules and clusters of a few granules to which is attached a vulcanizable rubber compound whereby the mass is capable of being rolled into a sheet without substantial crushing of the abrasive granules, sheeting the mass between revolving rolls, and cutting an article from the sheet and vulcanizing it.

9. The method of making a rubber bonded abrasive article which comprises working sheet rubber into a plastic mass, separately preparing a mixture comprising abrasive grains and a dispersion of previously coagulated rubber, disintegrating said mixture into a mass of individual granules and clusters of a few granules to which is attached unvulcanized rubber capable of protecting the abrasive grains from substantial crushing when subjected to the forces required to mix them into the plastic sheet rubber, combining the granular mass and the mass of plastic sheet rubber into a homogeneous mixture by passing the two masses simultaneously between rolls spaced apart further than the greatest dimension of the abrasive granules, sheeting the mass between revolving rolls, and cutting an article from the sheet.

CHARLES S. NELSON.
DONALD B. SHARPE.